US008794383B2

(12) United States Patent
Furseth et al.

(10) Patent No.: US 8,794,383 B2
(45) Date of Patent: Aug. 5, 2014

(54) LADDER STAND

(71) Applicants: Michael R. Furseth, Cumberland, WI (US); Randy L. Schamberger, Cumberland, WI (US); Scott R. Nickell, Cumberland, WI (US); Ben T. Nelson, Cameron, WI (US)

(72) Inventors: Michael R. Furseth, Cumberland, WI (US); Randy L. Schamberger, Cumberland, WI (US); Scott R. Nickell, Cumberland, WI (US); Ben T. Nelson, Cameron, WI (US)

(73) Assignee: Rivers Edge Tree Stands, Inc., Cumberland, WI (US)

( * ) Notice: Subject to any disclaimer, the term of this patent is extended or adjusted under 35 U.S.C. 154(b) by 0 days.

(21) Appl. No.: 13/737,583

(22) Filed: Jan. 9, 2013

(65) Prior Publication Data
US 2013/0248287 A1 Sep. 26, 2013

Related U.S. Application Data

(60) Provisional application No. 61/584,696, filed on Jan. 9, 2012.

(51) Int. Cl.
*E04G 3/24* (2006.01)
*A01M 31/02* (2006.01)

(52) U.S. Cl.
CPC ..................................... *A01M 31/02* (2013.01)
USPC .............................. 182/187; 182/116; 182/93

(58) Field of Classification Search
CPC .............. E06C 7/16; E06C 1/04; E06C 1/06; E06C 1/08; E06C 1/12; E06C 1/125; A01M 31/02
USPC ......... 182/187, 188, 116, 82, 92, 94, 97, 115, 182/119
See application file for complete search history.

(56) References Cited

U.S. PATENT DOCUMENTS

| 3,220,766 A | 11/1965 | Kates |
| 3,279,134 A | 10/1966 | John |
| 3,358,789 A | 12/1967 | Laun |
| 3,419,108 A | 12/1968 | Mobbs |
| 4,022,292 A | 5/1977 | Van Gompel |
| 4,129,198 A | 12/1978 | Hunter |
| 4,134,474 A | 1/1979 | Stavenau et al. |
| 4,257,490 A | 3/1981 | Bandy |
| 4,490,958 A | 1/1985 | Lowe |
| 4,539,455 A | 9/1985 | Colato et al. |
| 4,549,635 A | 10/1985 | Early |

(Continued)

OTHER PUBLICATIONS

Big Game Treestands; Brochure "Live the Legacy"; Windom, Minnesota, United States; 2007 (46 pgs.).

(Continued)

*Primary Examiner* — Daniel Cahn
(74) *Attorney, Agent, or Firm* — Stoel Rives LLP (57) ABSTRACT

A ladder stand configured to attach to a post to provide an elevated platform. The ladder stand includes a ladder and a platform assembly coupled to the ladder. A pair of lateral support members include proximal ends pivotally attached to opposite sides of the platform and distal ends configured to be positioned toward an opposite side of the post. The distal ends of the support members are configured to be secured to the post. A stabilizer member pivotally connects to an intermediate portion of the ladder and extends toward with the support post. The stabilizing member includes a stabilizing plate configured to engage the support post. At least one support straps connects the distal ends of lateral support members to the post and the distal ends of the lateral support members to the stabilizing member.

8 Claims, 10 Drawing Sheets

(56) References Cited

U.S. PATENT DOCUMENTS

| | | | |
|---|---|---|---|
| 4,552,247 A | 11/1985 | Purdy | |
| 4,579,198 A | 4/1986 | Lee | |
| 4,661,245 A | 4/1987 | Rutherford et al. | |
| 4,708,221 A | 11/1987 | Kubiak | |
| 4,742,888 A * | 5/1988 | Amacker | 182/116 |
| 4,782,918 A | 11/1988 | Brunner et al. | |
| 4,784,239 A | 11/1988 | Kirkman | |
| 4,787,111 A | 11/1988 | Pacek et al. | |
| 4,901,490 A | 2/1990 | Zinniel et al. | |
| 4,905,792 A | 3/1990 | Wilson | |
| 4,909,660 A | 3/1990 | Ferns | |
| 4,945,858 A | 8/1990 | Myers et al. | |
| 4,951,696 A | 8/1990 | Jones, Sr. | |
| 4,977,793 A | 12/1990 | Husted | |
| 4,997,063 A | 3/1991 | Bradley | |
| 5,009,283 A | 4/1991 | Prejean | |
| 5,060,756 A | 10/1991 | D'acquisto | |
| 5,064,020 A | 11/1991 | Eagleson | |
| 5,079,884 A | 1/1992 | Menchetti | |
| 5,105,908 A | 4/1992 | Freund | |
| 5,117,942 A | 6/1992 | Tzavaras | |
| D329,501 S | 9/1992 | Friesenhahn | |
| 5,275,257 A | 1/1994 | Robertson | |
| 5,279,390 A * | 1/1994 | Phillips | 182/187 |
| 5,297,656 A | 3/1994 | Amacker | |
| 5,310,019 A | 5/1994 | Paul | |
| 5,339,922 A | 8/1994 | Beechler | |
| 5,363,941 A | 11/1994 | Richard | |
| 5,368,127 A * | 11/1994 | Phillips | 182/187 |
| 5,477,654 A | 12/1995 | Weelink | |
| 5,480,729 A | 1/1996 | Hattori et al. | |
| 5,527,585 A | 6/1996 | Needham et al. | |
| 5,558,179 A | 9/1996 | Matthews | |
| 5,564,524 A | 10/1996 | Thaggard et al. | |
| 5,641,036 A | 6/1997 | Maxwell | |
| 5,776,582 A | 7/1998 | Needham | |
| 5,791,436 A * | 8/1998 | Talley, Sr. | 182/116 |
| 5,842,540 A | 12/1998 | Mancini, Jr. | |
| 5,881,839 A | 3/1999 | Stanley | |
| 5,927,435 A | 7/1999 | Benton | |
| 5,927,437 A | 7/1999 | Fast | |
| 5,979,603 A | 11/1999 | Woller | |
| 5,992,112 A | 11/1999 | Josey | |
| 5,996,738 A | 12/1999 | Nelsen | |
| 6,053,278 A * | 4/2000 | Myers | 182/20 |
| 6,119,428 A | 9/2000 | Gumz | |
| 6,120,712 A | 9/2000 | Chase | |
| 6,145,619 A | 11/2000 | Risser | |
| 6,170,216 B1 | 1/2001 | Rye et al. | |
| 6,199,660 B1 | 3/2001 | Meeks | |
| D445,201 S | 7/2001 | D'acquisto | |
| D452,331 S | 12/2001 | Bohlman | |
| 6,325,174 B1 * | 12/2001 | Lamar | 182/187 |
| 6,336,520 B1 | 1/2002 | Amacker | |
| 6,386,321 B1 | 5/2002 | Muhich | |
| 6,455,131 B2 | 9/2002 | Lopez-anido et al. | |
| 6,471,004 B2 | 10/2002 | Stringer et al. | |
| 6,505,707 B1 | 1/2003 | Berry | |
| 6,513,292 B2 | 2/2003 | Kumon | |
| 6,516,919 B1 | 2/2003 | Sempel | |
| 6,520,291 B2 | 2/2003 | Andrey | |
| 6,568,505 B1 | 5/2003 | D'acquisto | |
| 6,622,823 B2 | 9/2003 | Engstrom | |
| 6,722,472 B2 | 4/2004 | Berkbuegler | |
| 6,725,972 B1 | 4/2004 | Krier et al. | |
| 6,817,446 B1 | 11/2004 | Bisland | |
| 6,824,115 B1 | 11/2004 | Batson | |
| 6,866,120 B1 | 3/2005 | Butterworth | |
| 6,883,644 B1 | 4/2005 | Braun et al. | |
| 6,942,065 B1 | 9/2005 | Price | |
| 6,948,587 B2 | 9/2005 | Griffiths | |
| 7,021,423 B1 * | 4/2006 | Pestrue et al. | 182/116 |
| 7,090,083 B2 | 8/2006 | Russell et al. | |
| RE39,275 E | 9/2006 | Chang et al. | |
| 7,174,688 B2 | 2/2007 | Higginbotham | |
| 7,174,995 B1 | 2/2007 | Alexander | |
| RE39,725 E | 7/2007 | Muhich | |
| 7,237,649 B2 * | 7/2007 | Harmston | 182/93 |
| 7,246,683 B2 | 7/2007 | Pringnitz | |
| 7,377,361 B1 | 5/2008 | Tschida | |
| 7,434,662 B2 | 10/2008 | McFall et al. | |
| 7,717,232 B2 * | 5/2010 | Butcher | 182/178.3 |
| 7,850,010 B2 | 12/2010 | Takev | |
| 7,931,237 B2 | 4/2011 | Penzo | |
| D645,571 S | 9/2011 | Furseth et al. | |
| 8,042,652 B2 * | 10/2011 | Weir | 182/116 |
| 8,113,347 B2 | 2/2012 | Kohring et al. | |
| 8,177,177 B2 | 5/2012 | Ehrig et al. | |
| 8,231,010 B2 | 7/2012 | Scott et al. | |
| 8,424,645 B2 | 4/2013 | Schlipf | |
| 2002/0100637 A1 | 8/2002 | Stringer et al. | |
| 2002/0112919 A1 | 8/2002 | Graham, Jr. | |
| 2003/0019176 A1 | 1/2003 | Anderson | |
| 2003/0192741 A1 | 10/2003 | Berkbuegler | |
| 2004/0065043 A1 | 4/2004 | Foderberg et al. | |
| 2004/0084248 A1 | 5/2004 | Burgeson | |
| 2004/0216953 A1 | 11/2004 | Cheeks | |
| 2005/0167200 A1 | 8/2005 | McFall et al. | |
| 2006/0054397 A1 | 3/2006 | Pringnitz | |
| 2007/0000726 A1 | 1/2007 | Berkbuegler | |
| 2007/0022696 A1 | 2/2007 | Kim | |
| 2007/0039779 A1 | 2/2007 | Ellingson | |
| 2007/0181365 A1 | 8/2007 | Braud | |
| 2007/0256897 A1 | 11/2007 | Feltner | |
| 2007/0261919 A1 | 11/2007 | Roe | |
| 2008/0105490 A1 * | 5/2008 | Butcher | 182/116 |
| 2008/0128204 A1 * | 6/2008 | Engstrom | 182/116 |
| 2008/0149422 A1 | 6/2008 | Lott | |
| 2009/0183455 A1 | 7/2009 | Polk et al. | |
| 2009/0229916 A1 | 9/2009 | Berkbuegler | |
| 2009/0277721 A1 * | 11/2009 | Weir | 182/115 |
| 2009/0321186 A1 | 12/2009 | Louchart | |
| 2010/0065371 A1 | 3/2010 | Glenn | |
| 2010/0126803 A1 | 5/2010 | Cama | |
| 2010/0270105 A1 | 10/2010 | Hovey et al. | |
| 2010/0300808 A1 | 12/2010 | Hale | |
| 2011/0132686 A1 | 6/2011 | Priest | |
| 2011/0180351 A1 | 7/2011 | Cama | |
| 2012/0080267 A1 | 4/2012 | Furseth et al. | |
| 2012/0080269 A1 | 4/2012 | Furseth et al. | |
| 2012/0111666 A1 | 5/2012 | Furseth et al. | |
| 2012/0168249 A1 | 7/2012 | Furseth et al. | |
| 2012/0175190 A1 | 7/2012 | Schlipf | |
| 2012/0199418 A1 | 8/2012 | Priest | |

OTHER PUBLICATIONS

Cabela's; Catalog "Archery"; Sidney, Nebraska, United States; 2006 (8 pgs.).

Office Action mailed Jan. 19, 2010 in U.S. Appl. No. 11/627,772, filed Jan. 26, 2007.

Office Action mailed Aug. 19, 2010 in U.S. Appl. No. 11/627,772, filed Jan. 26, 2007.

Office Action mailed Mar. 29, 2011 in U.S. Appl. No. 11/627,772, filed Jan. 26, 2007.

* cited by examiner

LADDER STAND

RELATED APPLICATIONS

The present application claims the benefit of U.S. Provisional Application No. 61/584,696, entitled Ladder Stand, filed Jan. 9, 2012, the entire of disclosure of which is hereby incorporated by reference.

TECHNICAL FIELD

The present disclosure relates to ladder stands, and in particular to a bracing system for a tree stand.

BACKGROUND OF THE INVENTION

Hunting wild game from a position elevated above the ground provides several benefits over hunting from ground level. A hunter that is perched above the ground can be positioned above an animal's normal field of view, reducing a likelihood that the animal may spot the hunter first. The scent of the hunter is also above the prey's nose, minimizing the chance that the animal will smell the hunter before the hunter can spot the animal. Also, the hunter's range of vision may be increased and allow shots over otherwise obstructing limbs and brush.

A variety of tree stands have been developed that can elevate hunters above the ground and allow the aforementioned benefits. These tree stands may be configured to be readily attached to a tree, post, or other vertical support member to provide a platform, seat, or combination of both at any desired level above the ground. One type of tree stand is a ladder stand. Typical ladder stands include a ladder that may be used to support the platform and seat. Ladder stands may be installed by attaching a platform and seat assembly to a ladder, leaning the ladder against the tree, and securing the ladder stand to the tree.

Some commercial ladder stands are secured to a tree by an installer ascending the ladder and wrapping a securing strap around the tree. During the process of securing a ladder stand to a tree, the Treestand Manufacturer's Association recommends that two installers hold the base of the ladder to provide lateral support to prevent the ladder stand from pivoting about the tree axis (e.g., vertical axis of trunk of tree) or "rolling-off" the tree. Present ladder stands may also include a pair of tie-off ropes that may be attached to the platform. After the ladder is leaned against a tree, the tie-off ropes are wrapped around the tree and are attached to the ladder, prior to an installer climbing the ladder. When utilized, tie-off ropes provide some additional lateral security to prevent a ladder stand from rolling-off a tree. However, even when tie-off ropes are utilized, it is recommended that two installers secure the base of a ladder to provide additional lateral support. Rivers Edge Tree Stands Operator's Manual: One Man Tree Stands, which is attached hereto as Appendix A, and hereby incorporated herein by reference in its entirety, describes some present ladder stands and installation procedures.

BRIEF SUMMARY OF THE INVENTION

The present disclosure provides embodiments of ladder stands that provide additional lateral security to limit or prevent the ladder stand from pivoting about a longitudinal axis (e.g., vertical axis) of a support post, such as a tree trunk. The ladder stands may be configured to be secured to a support post by a single installer from the ground. The ladder stands may provide greater resistance to pivoting about the longitudinal axis of the support post than tie off ropes and two installers holding the base of the ladder.

In one embodiment, the ladder stand is configured to attach to a post to provide an elevated platform. The ladder stand includes a ladder and a platform assembly coupled to the ladder. A pair of lateral support members include proximal ends pivotally attached to opposite sides of the platform and distal ends configured to be positioned toward an opposite side of the post. The distal ends of the support members are configured to be secured to the post. A stabilizer member pivotally connects to an intermediate portion of the ladder and extends toward with the support post. The stabilizing member includes a stabilizing plate configured to engage the support post. At least one support straps connects the distal ends of lateral support members to the post and the distal ends of the lateral support members to the stabilizing member.

In one embodiment, distal ends of the lateral support members include post engagement features configured to engage with the post. Swivel brackets preferably connect the proximal ends of the lateral support members to the platform. The lateral support members are preferably configured to move through at least two degrees of freedom relative to the platform. The lateral support members are configured to move independently from each other relative to the platform. A distance between the distal ends of lateral support members and the platform assembly can be varied by rotation of the lateral support members relative to the platform.

The stabilizer plate preferably includes a plurality of attachment features to releasably couple with the support straps. The support straps can be releasably coupled to the intermediate portion of the ladder. The support straps are preferably configured to wrap around the post near the distal ends of the lateral support members. In one embodiment, the support straps are configured to extend from the post to the intermediate portion of the ladder.

Additional aspects and advantages will be apparent from the following detailed description of preferred embodiments, which proceeds with reference to the accompanying drawings.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION OF PREFERRED EMBODIMENTS

The present disclosure provides embodiments of ladder stands that may include lateral support members configured to provide additional lateral support. The ladder stands may be configured to allow a single user to secure an elevated ladder stand to a support post (e.g., a tree trunk) from the ground. The ladder stands may enable an installer to safely ascend the ladder and secure the ladder stand to the support post without needing two installers to hold the base of the ladder. A user may desire an elevated position for a variety of reasons. For example, a user, such as a hunter, may use the stand to obtain an elevated position from which to hunt. As another example, the ladder stand may also be used for maintenance of equipment, such as power lines, that is in an elevated position and/or supported by an upright and/or generally vertical support structure.

The embodiments disclosed herein are described in terms of their use for hunting and with reference to trees. As can be appreciated, the scope of the disclosure is not so limited and the embodiments described herein can be configured for a variety of purposes and for use with a variety of vertical and/or generally upright support structures.

Figure 1:
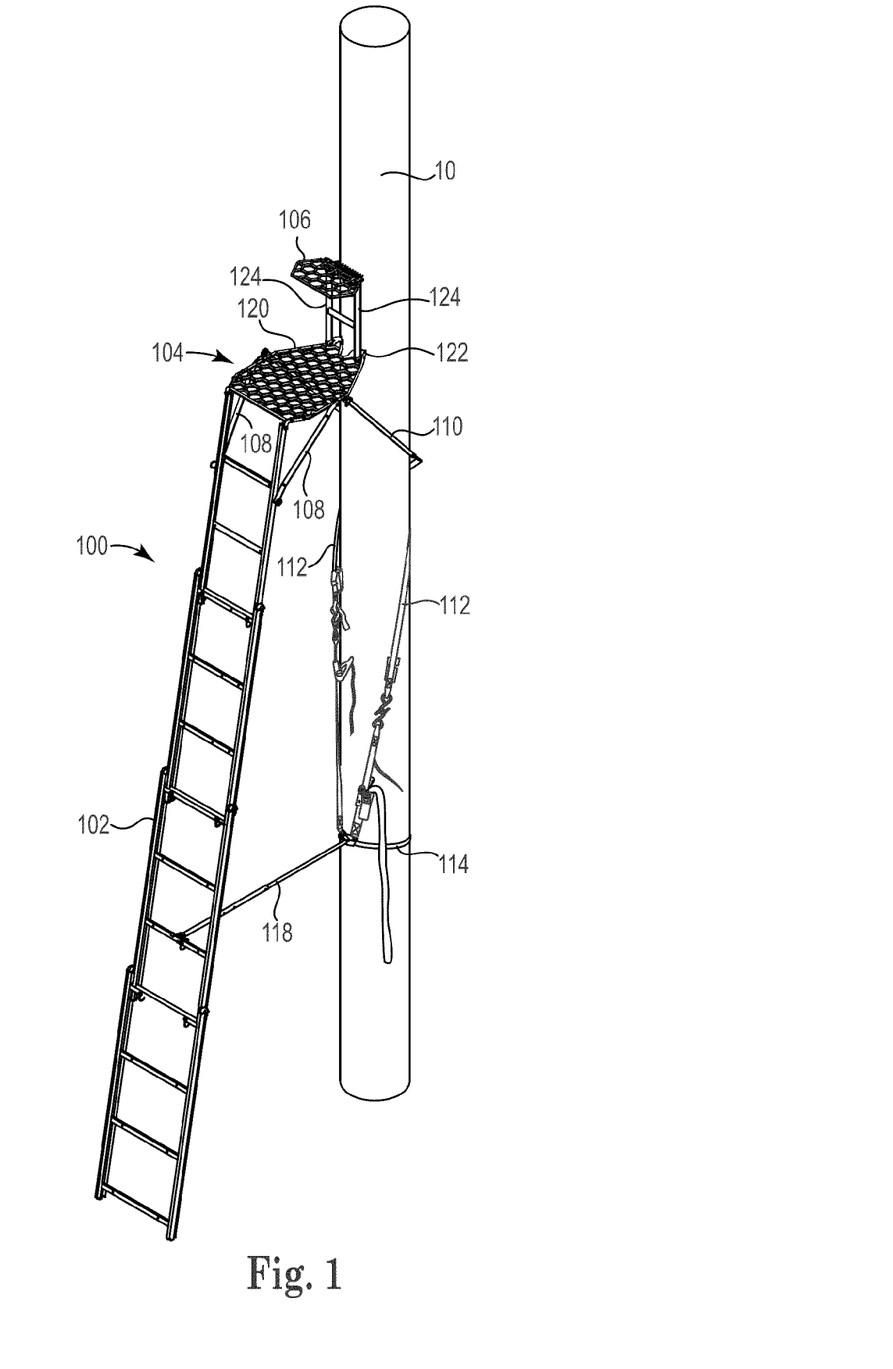
FIG. 1 illustrates a perspective view of a ladder stand, according to one embodiment of the present disclosure.

FIG. 1 illustrates a perspective view of a ladder stand 100 installed on a support post 10, such as for example a tree, in accordance with an embodiment of the present disclosure. The ladder stand 100 includes a ladder 102, a platform assembly 104, seat 106, a support brace 108, lateral support members 110, lateral securement straps 112, stabilizer strap 114, installation straps 116, and a stabilizer 118. The ladder 102 supports the platform assembly 104 and allows a hunter to ascend and descend the ladder stand 100. The platform assembly 104 includes a platform 120 and may be configured to allow a hunter to stand on the platform 120. The seat 106 may be configured to be positioned above the platform 104 and may provide a place for the hunter to sit. The ladder stand 100 can be constructed of any suitable materials capable of bearing weight and withstanding the weather elements, such as for example, powder-coated all-weather steel, aluminum, fiber reinforced thermoset resins, natural or engineered wood products, carbon fiber, composite materials, and/or combinations thereof. Components of the ladder stand 100 are connected using fasteners, such as bolts or rivets, or welded connections. The ladder stand 100 can optionally be camouflaged and/or covered by a blind to conceal a hunter's presence. The ladder stand 100 materials can be camouflaged using a powder coating technique, water emersion printing, thin film coating, color fusion, or another suitable technique.

The platform assembly 104 is connected for example, to a top of the ladder 102. The platform assembly 104 includes a platform 120, a post engagement portion 122, and seat support posts 124. The platform 120 is preferably constructed of a rigid material configured to support the weight of one or more hunters, such as steel or aluminum mesh welded on top of steel or aluminum tubing. The platform 120 can also be constructed out of cast metals or alloys, such as cast aluminum. The post engagement portion 122 includes a rigid, serrated edge for "biting" into, for example, a tree trunk or wooden post. Example embodiments of a platform 120 and a post engagement portion 122 are described in U.S. patent application Ser. No. 13/252,876, which was filed Oct. 4, 2011, and is entitled "TREE STAND," and U.S. patent application Ser. No. 13/293,960, which was filed Nov. 10, 2011, and is entitled "LOAD-BEARING PLATFORM," both of which are hereby incorporated by reference herein in their entirety.

The platform and the seat 104 may be coupled together by seat support posts 124. The support braces 108 may be coupled to the platform 120 and extend at an angle downward and couple to the ladder 102 at a position removed from (e.g., below) the top end of the ladder that is coupled to the platform assembly 104.

Figure 2:
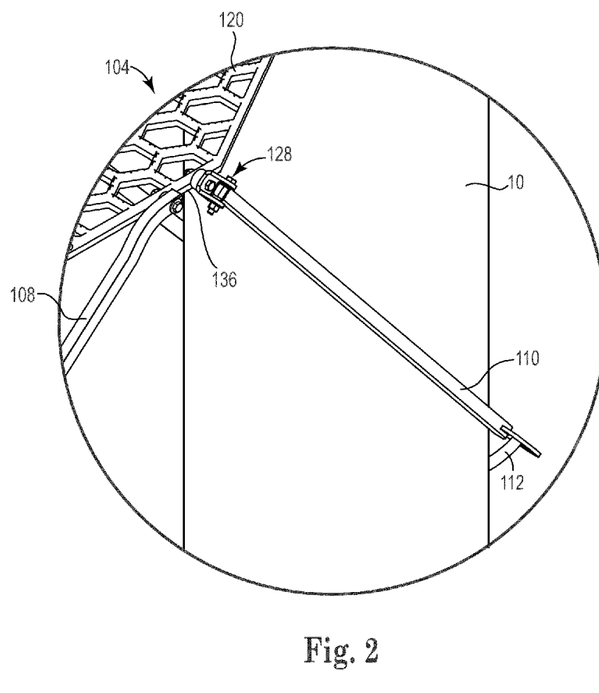
FIG. 2 illustrates a detailed view of embodiments of a swivel mounting bracket and a lateral support member of the ladder stand of FIG. 1.
Figure 3:
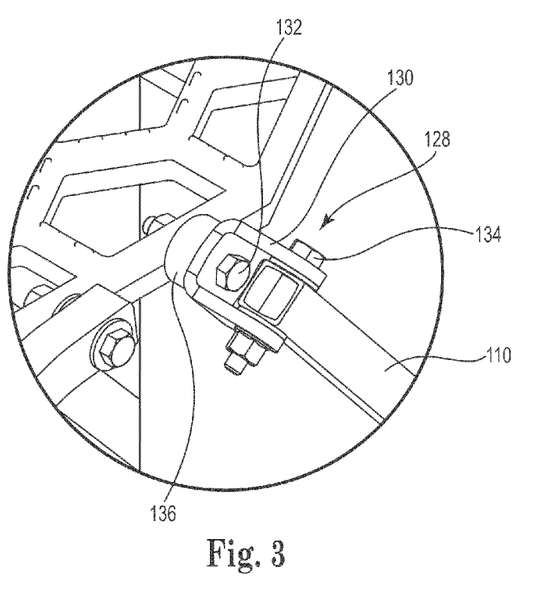
FIG. 3 illustrates a more detailed view of the lateral support member coupled to the swivel mounting bracket of the ladder stand of FIG. 1.
Figure 4:
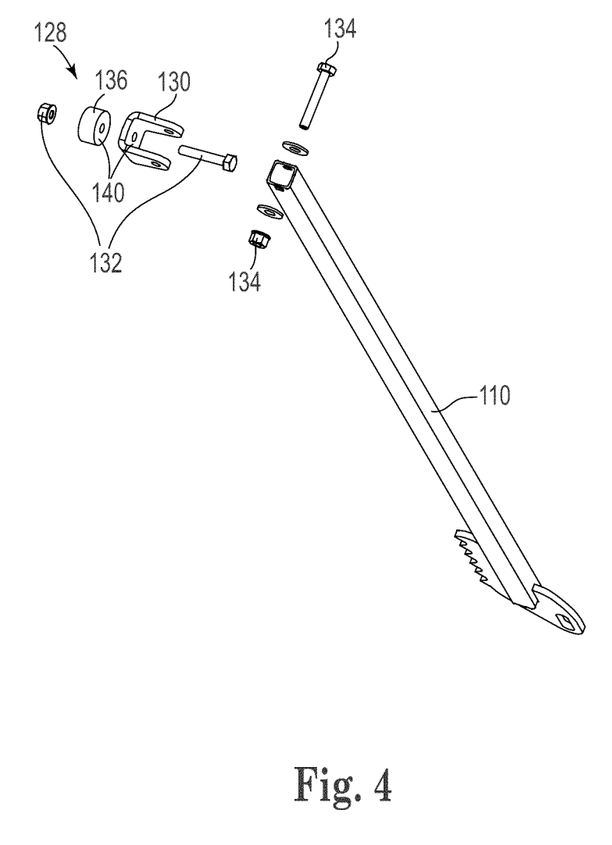
FIG. 4 is an exploded view of a joint where the lateral support member couples to the swivel mounting bracket of the ladder stand of FIG. 1.

FIG. 2 illustrates a detailed view of a portion of the ladder stand 100, and specifically illustrates a lateral support member 110 coupled to a swivel mounting bracket 128. FIG. 3 illustrates a detailed view of the lateral support member 110 coupled to the swivel mounting bracket 128 of the ladder stand 100. FIG. 4 is an exploded view of a joint where the lateral support member 110 couples to the swivel mounting bracket 128 of the ladder stand of FIG. 1.

Referring generally and collectively to FIGS. 2-4, the lateral support members 110 may be attached to the platform assembly 104 at a swivel mounting bracket 128. The swivel mounting bracket 128 may include a swivel 130, a swivel fastener 132, and a lateral support member fastener 134. The lateral support member fastener 134 extends along an axis around which lateral support member 110 can rotate.

A mounting plate 136 may be secured to the platform assembly 104. In the illustrated embodiment, the mounting plate 136 may be welded to the platform assembly 104. The swivel 130 is rotatably coupled to the mounting plate 136 via the swivel fastener 132, such that the swivel 130 can rotate. The swivel fastener 132 comprises an axis around which the swivel 130 can preferably rotate 360 degrees. In the illustrated embodiment, the swivel fastener 132 may include a nut and bolt combination running through a hole 140. The lateral support member 110 is pivotally connected to the swivel 130 such that the lateral support member 110 can freely swing about one hundred and eighty degrees.

Figure 5A:
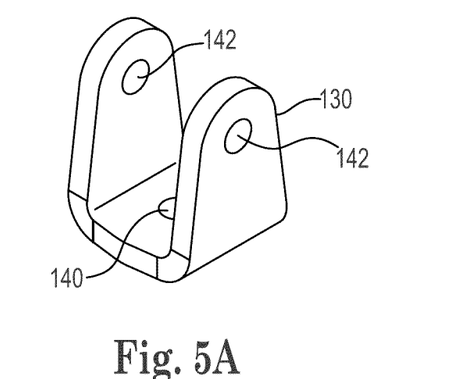
FIGS. 5A-5C illustrate a swivel of a swivel mounting bracket of a ladder stand, according to one embodiment.
Figure 5B:
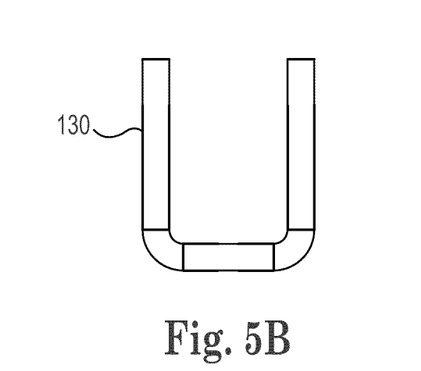
Figure 5C:
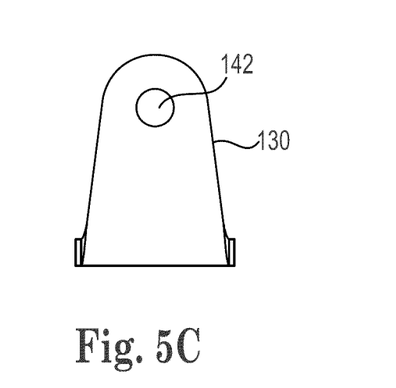

FIGS. 5A-5C illustrate the swivel 130 of the swivel mounting bracket 128 of the ladder stand 100. The swivel 130 may be a U-shaped bracket having a hole 140 through the base, for coupling the swivel to a mounting plate 136 and/or the platform assembly 104, and holes 142 through the ends, for coupling the lateral support member 110 to the swivel 130. The swivel mounting bracket 128 permits the lateral support members 110 to move independently through at least two degrees of freedom. In another embodiment, the lateral support members 110 are telescopically extendable to independently increase or decrease their length.

Figure 6A:
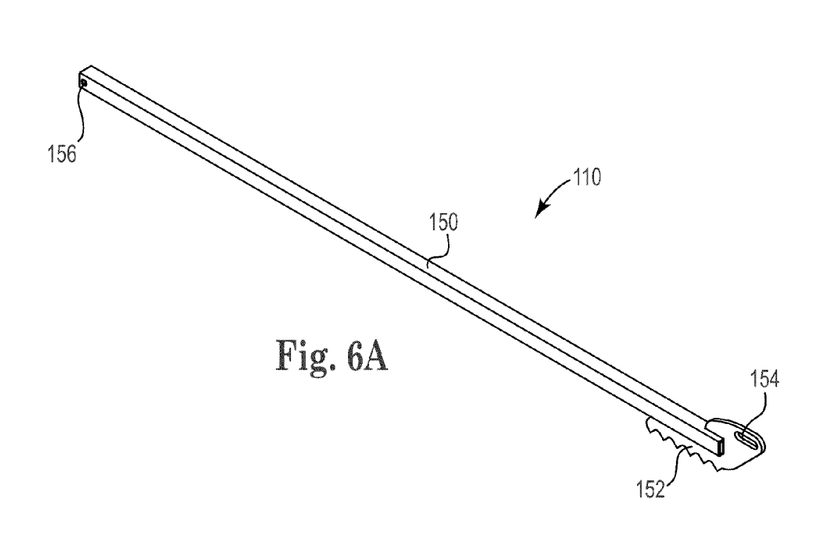
FIGS. 6A-6C illustrate a lateral support member of the ladder stand of FIG. 1, according to one embodiment.
Figure 6B:
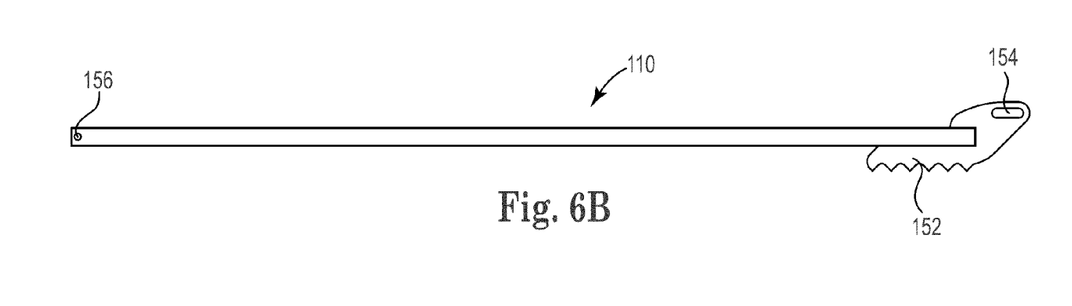
Figure 6C:
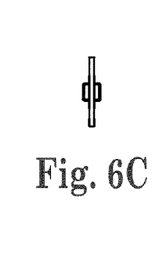

FIGS. 6A-6C illustrate a lateral support member 110 of the ladder stand 100. The lateral support member 110 includes a shaft 150, a post engagement member 152, lateral stabilizer strap connection 154, and a swivel connection 156. The swivel connection 156 of the lateral support member 110 is connected to the swivel 130 via the lateral support member fastener 134. In the illustrated embodiment, the swivel connection 156 may be a hole and the lateral support member fastener 134 may be a nut and bolt combination. The lateral support member fastener 134 (e.g., bolt) is placed though the holes 142 and swivel connection 156. The swivel 130, which can rotate three hundred and sixty degrees, and the swivel connection 156, which allows rotation through about one hundred and eighty degrees, allow the lateral support members 110 to accommodate trees (or other support posts) of various widths and sizes and allow the post engagement members 152 to be aligned to engage a tree (or other support posts) in a plane that allows maximum contact with the tree or other support post.

The lateral stabilizer strap connection 154 allows a lateral securement strap 112 to be connected to lateral support member 110. The lateral securement strap 112 can be connected to the lateral support member 110 using a hook, clip, carabineer, or the like. When the ladder stand 100 is installed, as shown in FIG. 1, the lateral securement straps 112 may be connected to lateral support members 110 at one end, wrapped around the tree (or other support post), and connected to the stabilizer 118 at the opposite end.

Figure 7:
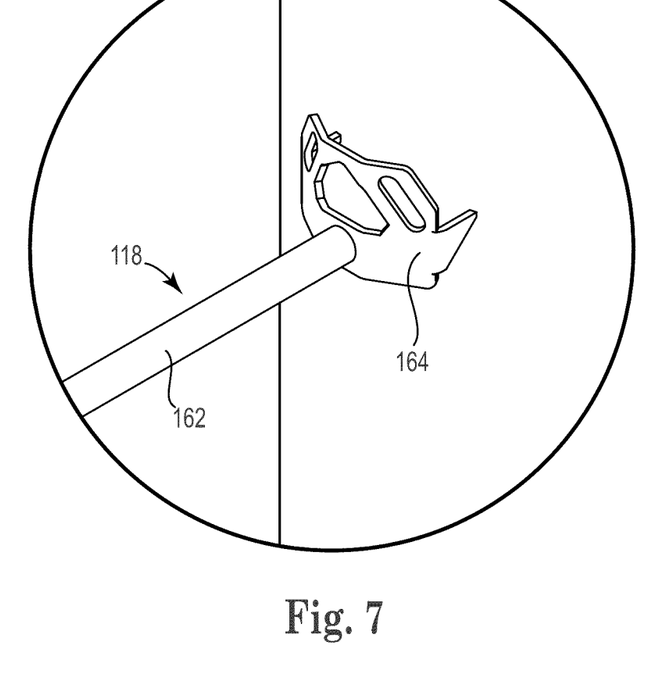
FIG. 7 illustrates a stabilizer of the ladder stand of FIG. 1, according to one embodiment of the present disclosure.

The stabilizer 118 is shown in detail in FIG. 7. The stabilizer 118 may provide additional support for the ladder 102 and may provide lateral support for the ladder stand 100. As shown in FIG. 7, the stabilizer 118 may include a stabilizer bar 162 and a stabilizer plate 164. The stabilizer plate 164 may be configured to engage a tree trunk or other wooden support post and may dig into the wood to provide slip-resistant engagement with the support post. The stabilizer plate 164 may include one or more eyelets configured to accept hooks of the lateral securement straps 112 or otherwise allow connection of the lateral securement straps 112. In the illustrated embodiment, the lateral securement straps 112 may be secured to the stabilizer plate 164.

Figure 8:
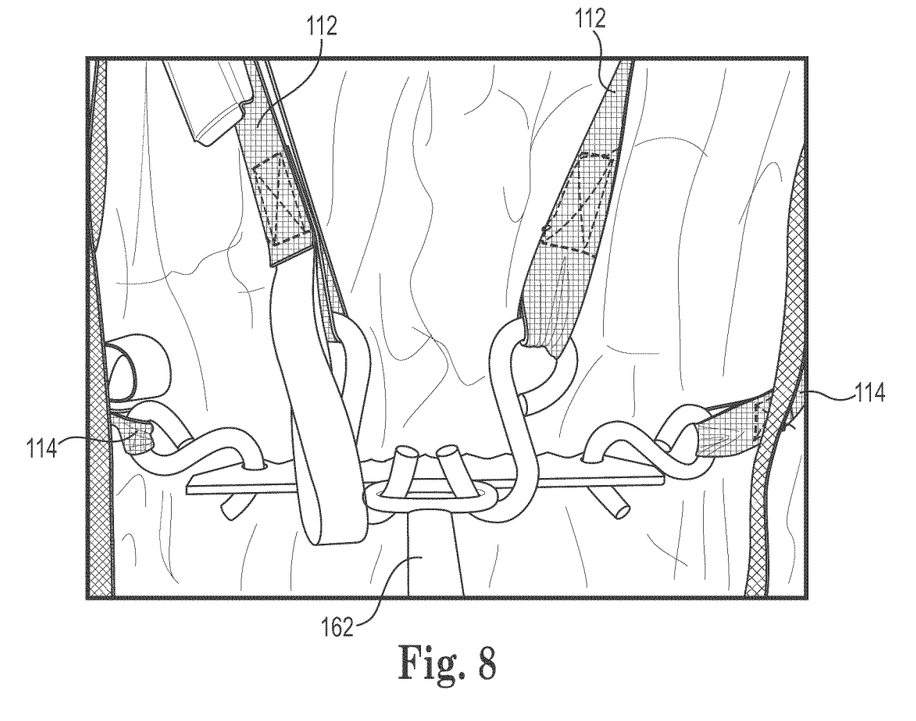
FIG. 8 illustrates a stabilizer plate of a stabilizer securing lateral straps and a stabilizer strap of a ladder stand according to one embodiment of the present disclosure.

FIG. 8 illustrates a stabilizer plate of a stabilizer, according to one embodiment, securing straps of a ladder stand.

Figure 9:
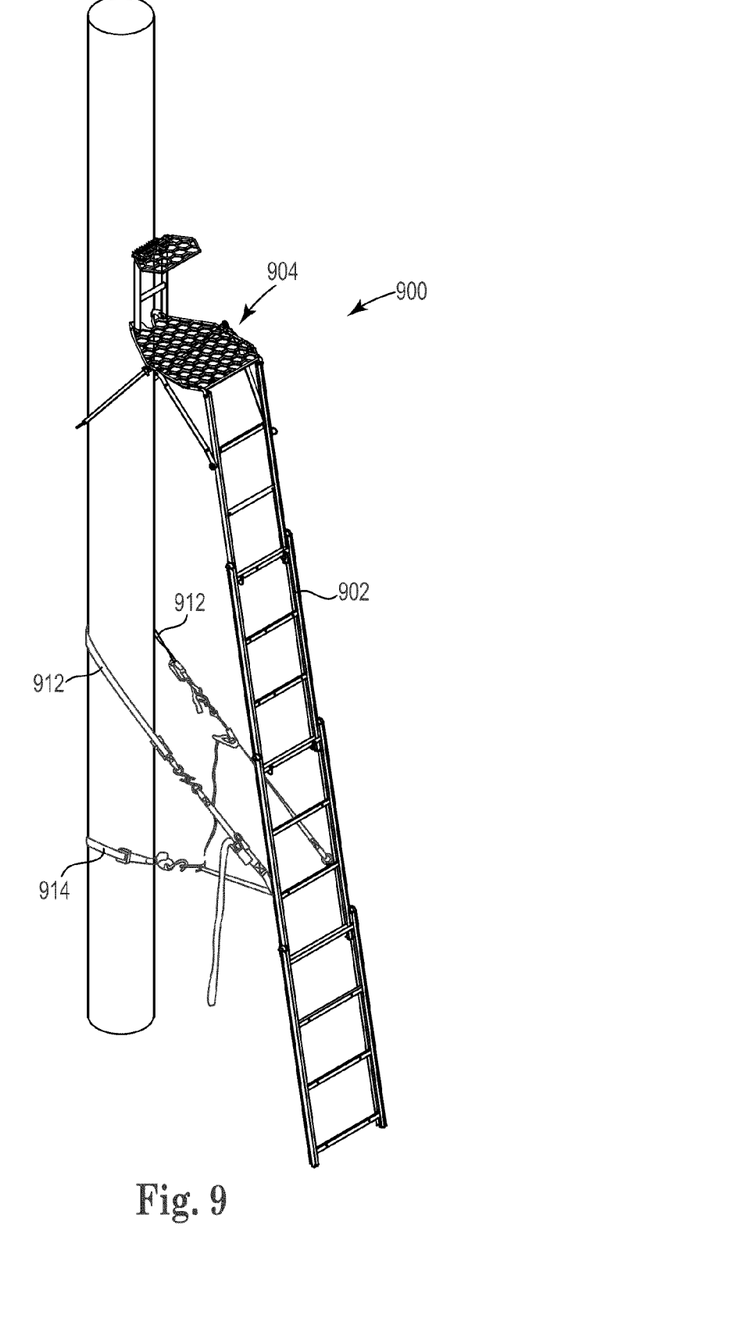
FIG. 9 illustrates a perspective view of a ladder stand, according to another embodiment, with the lateral support straps secured to the ladder.

FIG. 9 illustrates a perspective view of a ladder stand 900, according to another embodiment. Lateral support straps 912 may be secured to lateral support members 910, wrapped around a tree, and coupled to a ladder 902 of the ladder stand 900.

Figure 10A:
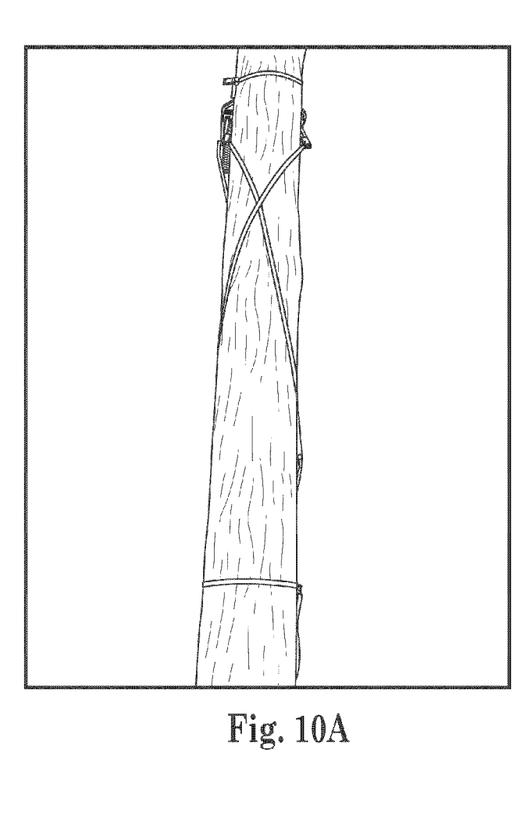
FIGS. 10A and 10B illustrate a backside of a support post showing the lateral fixation straps wrapped around the support post.
Figure 10B:
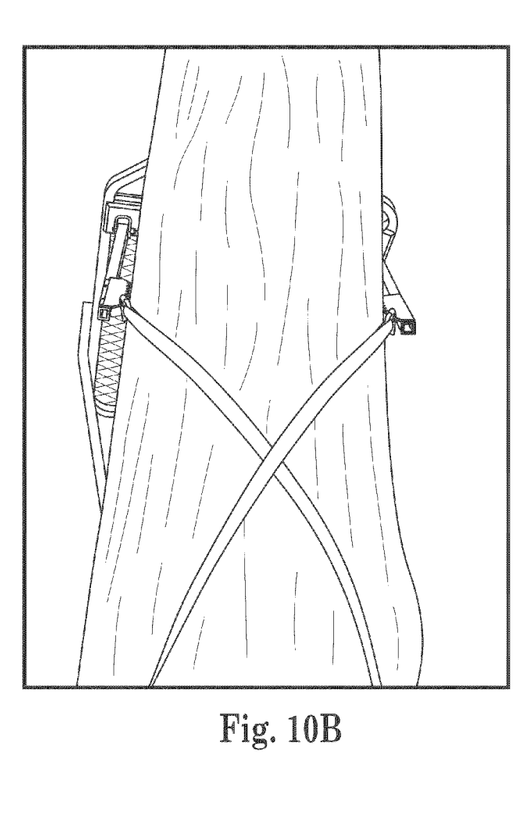

FIGS. 10A and 10B illustrate a backside of a support post showing the lateral straps wrapped around the support post.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges, which may independently be included in the smaller ranges, is also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the disclosure, the preferred methods and materials are now described. All patents and publications mentioned herein, including those cited in the Background of the application, are hereby incorporated by reference to disclose and describe the methods and/or materials in connection with which the publications are cited.

The publications discussed herein are provided solely for their disclosure prior to the filing date of the present application. Nothing herein is to be construed as an admission that the present disclosure is not entitled to antedate such publication by virtue of prior invention. Further, the dates of publication provided may be different from the actual publication dates which may need to be independently confirmed.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

As can be appreciated, the scope of the present disclosure fully encompasses other embodiments which may become obvious to those skilled in the art, and that the scope of the present disclosure is accordingly to be limited by nothing. Reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated.

What is claimed is:

1. A method of attaching a ladder stand to a post, the method comprising the steps of:
   attaching a platform assembly to a ladder, wherein the platform assembly comprises a platform with a top surface forming a major plane of said platform;
   positioning a pair of lateral support members onto opposite sides of the platform via swivel brackets, the swivel brackets providing the lateral support members at least two rotational degrees of freedom during the positioning step so that the lateral support members respectively can pivot with respect to said platform in a horizontal direction parallel with the major plane of said platform and pivot with respect to said platform in a vertical direction parallel with a vertical plane positioned orthogonal to the major plane of said platform;
   moving the lateral support members independently from each other through the at least two degrees of freedom relative to the platform so the lateral support members are oriented at a downward angle relative to the platform on opposite sides of the post;
   securing distal ends of the lateral support members to the post with at least one strap;
   connecting a stabilizing member to an intermediate portion of the ladder;
   securing a stabilizing plate of the stabilizing member to the post; and attaching a first end of the at least one strap to the distal ends of the lateral support members and attaching a second end of the at least one strap to the stabilizing member to connect the distal ends of the lateral supports with the stabilizing member.

2. The method of claim 1 comprising engaging post engagement features position on the distal ends of the lateral support members with the post.

3. The method of claim 1 comprising adjusting a distance between the distal ends of the lateral support members and the platform assembly by rotating the lateral support members.

4. The method of claim 1 comprising releasably coupling the second end of the at least one strap to the stabilizer plate.

5. The method of claim 1 comprising releasably coupling at least one stabilizer strap to the stabilizer plate.

6. The method of claim 1 comprising wrapping the at least one strap around the post near the distal ends of the lateral support members.

7. The method of claim 1 comprising configuring the stabilizer member to include a stabilizer bar and the stabilizer plate.

8. The method of claim 1 comprising the stabilizer member being capable of providing lateral support for the ladder stand.

* * * * *